United States Patent
Lipscomb et al.

(10) Patent No.: US 12,279,638 B2
(45) Date of Patent: Apr. 22, 2025

(54) FUNCTIONALLY ENHANCED FLOURS AND METHODS OF MAKING AND USING SAME

(71) Applicant: GHL Specialty Flours, LLC, Cedarburg, WI (US)

(72) Inventors: John M. Lipscomb, Cedarburg, WI (US); Omar I. Rodriguez, Cedarburg, WI (US); Chad C. Berge, Menomonee Falls, WI (US)

(73) Assignee: GHL Specialty Flours, LLC, Cedarburg, WI (US)

( * ) Notice: Subject to any disclaimer, the term of this patent is extended or adjusted under 35 U.S.C. 154(b) by 88 days.

(21) Appl. No.: 16/631,986

(22) PCT Filed: Jul. 18, 2018

(86) PCT No.: PCT/US2018/042715
§ 371 (c)(1),
(2) Date: Jan. 17, 2020

(87) PCT Pub. No.: WO2019/018543
PCT Pub. Date: Jan. 24, 2019

(65) Prior Publication Data
US 2020/0163366 A1 May 28, 2020

Related U.S. Application Data

(60) Provisional application No. 62/533,911, filed on Jul. 18, 2017.

(51) Int. Cl.
| A23L 7/10 | (2016.01) |
| A23L 19/15 | (2016.01) |
| A23L 33/105 | (2016.01) |
| A23P 30/20 | (2016.01) |

(52) U.S. Cl.
CPC .............. *A23L 7/198* (2016.08); *A23L 19/15* (2016.08); *A23L 33/105* (2016.08); *A23P 30/20* (2016.08); *A23V 2002/00* (2013.01)

(58) Field of Classification Search
CPC . A23L 7/198; A23L 7/10; A23L 7/197; A23L 33/15; A23L 19/15; A23L 33/105
See application file for complete search history.

(56) References Cited

U.S. PATENT DOCUMENTS

| 3,579,352 | A | 5/1971 | Bookwalter et al. |
| 4,440,794 | A | 4/1984 | Davies |
| 4,478,857 | A | 10/1984 | Stauss |
| 4,568,550 | A | 2/1986 | Fulger et al. |
| 5,332,592 | A | 7/1994 | Ishigaki et al. |
| 5,532,013 | A | 7/1996 | Martinez-Bustos et al. |
| 5,558,886 | A | 9/1996 | Martinez-Bustos et al. |
| 6,066,680 | A | 5/2000 | Cope |
| 7,250,186 | B2 | 7/2007 | Pfaller et al. |
| 7,748,312 | B2 | 7/2010 | Pfaller et al. |
| 8,163,324 | B2 | 4/2012 | Zimeri et al. |
| 8,709,523 | B2* | 4/2014 | Hoffman ................. A23P 30/20 426/622 |
| 8,778,442 | B2 | 7/2014 | Khan et al. |
| 9,011,947 | B2* | 4/2015 | Carder ................. A61K 36/899 426/28 |
| 9,149,060 | B2 | 10/2015 | Chatel et al. |
| 9,266,088 | B2 | 2/2016 | Lipscomb et al. |
| 9,266,089 | B2 | 2/2016 | Lipscomb et al. |
| 9,266,090 | B2 | 2/2016 | Lipscomb et al. |
| 9,491,926 | B2 | 11/2016 | Lipscomb et al. |
| 10,028,481 | B2 | 7/2018 | Lipscomb |
| 10,098,317 | B2 | 10/2018 | Lipscomb et al. |
| 10,499,663 | B2 | 12/2019 | Kivela et al. |
| 2007/0184175 | A1* | 8/2007 | Rubio .................... A21D 13/42 426/622 |
| 2007/0292583 | A1 | 12/2007 | Haynes et al. |
| 2010/0095899 | A1 | 4/2010 | Lipscomb et al. |
| 2014/0069344 | A1 | 3/2014 | Lipscomb et al. |
| 2014/0069345 | A1 | 3/2014 | Lipscomb et al. |
| 2014/0069346 | A1 | 3/2014 | Lipscomb et al. |
| 2014/0193563 | A1* | 7/2014 | Carder .................. A21D 6/003 426/549 |
| 2014/0335323 | A1 | 11/2014 | Lipscomb |
| 2015/0145164 | A1 | 5/2015 | Lipscomb |
| 2015/0181832 | A1 | 7/2015 | Lipscomb |
| 2015/0181834 | A1 | 7/2015 | Lipscomb |
| 2015/0196005 | A1 | 7/2015 | Lipscomb |
| 2015/0238931 | A1 | 8/2015 | Lipscomb et al. |
| 2016/0000033 | A9 | 1/2016 | Lipscomb |

(Continued)

FOREIGN PATENT DOCUMENTS

| CN | 1357562 | 7/2002 |
| EP | 1656837 | 5/2006 |

(Continued)

OTHER PUBLICATIONS

Ozcan, Serap and Jackson, David S., "Functionality Behavior of Raw and Extruded Corn Starch Mixtures" (2005). Faculty Publications in Food Science and Technology. 102.
Rheological properties of reactive extrusion modified waxy starch and waxy starch-polyacrylamide copolymer gels; Starch/Stärke 2013, 65, 984-990.
Chapter 1—General Overview of Food Hydrocolloids from Cellulose and Cellulose Derivatives in the Food Industry: Fundamentals and Applications, First Edition. Tanja Wüstenberg. 2015 Wiley-VCH Verlag GmbH & Co. KGaA. Published 2015 by Wiley-VCH Verlag GmbH & Co. KGaA.
Hydrocolloids in Food Processing, Thomas R. Laaman, © 2011 Blackwell Publishing, Ltd. and Institute of Food Technologists, by Wiley-Blackwell IFT Press.
Chapter 1—The Role of Hydrocolloids in the Development of Food Structure: Food Chemistry, Function and Analysis No. 18 Handbook of Food Structure Development, Edited by Fotis Spyropoulos, Aris Lazidis and Ian T. Norton by The Royal Society of Chemistry 2020; Published by the Royal Society of Chemistry.

(Continued)

*Primary Examiner* — Hong T Yoo
(74) *Attorney, Agent, or Firm* — Boyle Fredrickson S.C.

(57) ABSTRACT

A functionally enhanced flour provided by a manufacturing process that subjects a grain precursor to extrusion under low water, high pressure, and low heat dynamic conditions, and methods of using the resulting flour as an ingredient in food products for human and animal consumption.

51 Claims, 3 Drawing Sheets

(56) References Cited

U.S. PATENT DOCUMENTS

| | | | |
|---|---|---|---|
| 2016/0007561 | A9 | 1/2016 | Lipscomb |
| 2016/0165835 | A1 | 6/2016 | Lipscomb et al. |
| 2016/0214081 | A1 | 7/2016 | Lipscomb |
| 2016/0346981 | A1 | 12/2016 | Lipscomb |
| 2016/0362345 | A1 | 12/2016 | Lipscomb |
| 2017/0188540 | A1 | 7/2017 | Lipscomb et al. |
| 2017/0245460 | A1 | 8/2017 | Lipscomb et al. |
| 2018/0325075 | A1 | 11/2018 | Lipscomb |
| 2019/0350162 | A1 | 11/2019 | Lipscomb et al. |
| 2020/0163366 | A1 | 5/2020 | Lipscomb et al. |
| 2020/0296975 | A1 | 9/2020 | Lipscomb et al. |
| 2023/0028386 | A1 | 1/2023 | Lipscomb |

FOREIGN PATENT DOCUMENTS

| | | |
|---|---|---|
| JP | S62 143659 | 6/1987 |
| JP | S62 208246 | 9/1987 |
| WO | 9922607 | 5/1999 |

OTHER PUBLICATIONS

Majzoobi et al., Granular cold-water swelling starch; properties, preparation and applications, a review; Food Hydrocolloids 111 (2021) 106393.

Understanding and Measuring the Impact of Process Inputs on Degree of Cook in Starch-Based Systems, Bhimalingeswarappa Geera, 2009 Phd Thesis Dissertation at the University of Nebraska.

Soumya Banerjee & Suvendu Bhattacharya (2012) Food Gels: Gelling Process and New Applications, Critical Reviews in Food Science and Nutrition, 52:4, 334-346, DOI: 10.1080/10408398.2010.500234.

Chapter 5—Application of Natural Polymers in Food; © Springer International Publishing Switzerland 2016; O. Olatunji (ed.), Natural Polymers, DOI 10.1007/978-3-319-26414-1_5.

Vallons et al., "Promoting Structure Formation by High Pressure in Gluten-Free Flours", LWT—Food Science and Technology, vol. 44, No. 7, Sep. 1, 2011, pp. 1672-1680.

Murekatete, Nicole et al., "Characterization of Ready-to-Eat Composite . . . ", Pakistan Journal of Nutrition, Feb. 1, 2020, pp. 171-178.

Licata, Rebecca et al., "Determination of Formulation and Processing Factors Affecting Slowly Digestible Starch . . . ", International Journal of Food Science and Technology, vol. 49, No. 5, Dec. 30, 2013.

Mahasukhonthachat K et al., "Kinetics of Starch Digestion and Functional Properties of Twin-Screw Extruded Sorghum", Journal of Cereal Science, Academic Press Ltd, GB, vol. 51, No. 3, May 1, 2010.

Physical and nutritional impact of fortification of corn starch-based extruded snacks with common bean (*Phaseolus vulgaris* L.) flour: Effects of bean addition and extrusion cooking, Food Chemistry, vol. 113, Issue 4, 2009, pp. 989-996, ISSN 0308-8146.

\* cited by examiner

FUNCTIONALLY ENHANCED FLOURS AND METHODS OF MAKING AND USING SAME

CROSS-REFERENCE TO RELATED APPLICATIONS

This application claims priority in U.S. Provisional Patent Application Ser. No. 62/533,911, filed Jul. 18, 2017 the entirety of each of which is hereby expressly incorporated herein by reference.

STATEMENT AS TO RIGHTS TO INVENTIONS MADE UNDER FEDERALLY SPONSORED RESEARCH AND DEVELOPMENT

Not applicable.

FIELD OF THE INVENTION

The present invention relates to the field of food science. More particularly, the present invention relates to improved flours and methods of making and using same.

BACKGROUND OF THE INVENTION

Flour has been a component of the food making process for many millennia, and flour has long been made through simple grinding and milling of raw grains into a powder, which can later be used to help create a variety of food products. In particular, wheat and corn have had a long history of utilization around the world as a common source for flour.

However, flours have always presented a challenge when it comes to storage preservation and flavor stabilization. While yielding many benefits to the consumer, flours are also excellent food sources for unwanted pests and organisms such as bacteria and fungus, and if additional precautions are not taken, then stored flour is capable of becoming spoiled for human consumption very quickly. Modern spoilage precautions include heat treatment, bleaching chemicals, and preservative additions, all of which result in not only expanded shelf lives, but in altered flavor dynamics as well.

Flours are typically sold in the range of 12-14% water. At levels above 14% water, the likelihood of microbial and fungal concerns rise rapidly. Thus, it becomes highly desirable to produce and package a flour with lower water content for extended product longevity. The historical and modern processes of water reduction in flours yields unintended consequences to the nature of the flour itself. For example, the process of heating the flour to reduce the water content and/or to kill potential microbial presence, often converts some of the flour into a state of dietary fiber which is not as biologically utilizable and alters the flavor of the flour.

Additionally, modern food and starch extrusion techniques have focused on twin screw applications that utilize relatively wet processing and relatively lower pressures with applied heat during extrusion in order to reduce the gelatinization point of the starch being extruded. This combination of parameters requires additional heating and drying techniques after extrusion in order to boil off the water. The twin screws typically utilized are also very long and involve relatively lengthy material processing times. An additional drawback to present techniques is that the high water and hot environment of twin screw extrusion causes the unnecessary and premature degradation of various ingredients and nutrients contained in the extrudate. This degradation results in, among other things, alterations in the flour's flavor and functionality for later food-making applications.

Accordingly, it can be understood that improved flours with enhanced functionality are highly desirable in food science. There is clearly an unmet need in the food industry for such materials and methods of making said materials.

SUMMARY OF THE INVENTION

The present invention is based on the inventor's discovery that extruding whole grains or milled grains in a low water, high pressure, and low heat dynamic before flour milling can provide a functional flour having a variety of advantages over present flours, including one or more of: improved cold water starch solubility; reduced undesirable fiber content; lower water content; reduced flavor altering chemistries; stabilized and relatively homogeneous nutrient and flavor profiles; and enhanced overall natural flavor profiles minimizing the necessity of using additional flavors.

In a first aspect, the present invention provides a functionally enhanced flour produced by extruding a grain precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step.

In certain embodiments, the grain precursor is a whole grain. Alternatively, the grain precursor is milled, or is a mixture of whole and milled grains.

The grain precursor is, in certain embodiments, made of only a single grain. Alternatively, the grain precursor is a mixture of two or more grains.

The grain precursor can consist of only a whole grain, milled grain, or mixture thereof, or, alternatively, the grain precursor includes additional ingredients including an additional cereal grain, legume, fruit, vegetable, whey, proteins, such as protein isolates, vitamins, or mineral and nutrients.

High extrusion pressures are characteristic of this invention, and flours provided according to the invention are provided at, depending on particular flour embodiment, pressure ranges of about 2000 psi to about 20,000 psi, about 5000 psi to about 15,000 psi, or about 7500 psi to about 12,500 psi. Various embodiments utilize extrusion pressures greater than about 2000 psi, greater than about 3000 psi, greater than about 4000 psi, greater than about 5000 psi, or greater than about 10,000 psi.

Certain embodiments of functionally enhanced flour are reduced to a prescribed particle size distribution in a post-extrusion step.

Preferred flour embodiments of the invention are extruded using a single screw extruder. The single screw extruder provides a manufacturing environment appropriate for achieving the low water, high pressure, and low heat dynamics critical to the present invention. In yet another aspect, the invention provides a functionally enhanced flour for use in providing one or more of the following traits to a food product: cold water solubility in a food product; increasing water absorption in a food product; increasing oil absorption in a food product; providing flavor stability in a food product; increasing nutrient availability in a food product; reducing microbial activity in a food product; reducing fungal activity in a food product; and improving digestibility in the food product.

Yet another aspect of the invention encompasses a method of producing a functionally enhanced flour, comprising: extruding a grain precursor having a water content of about 10% to about 15% at an extrusion pressure greater than about 1000 psi to yield a functionally enhanced flour with a final water content of about 4% to about 10%, wherein: the extruding step is carried out without thermal input beyond heat generated from a changing pressure of extrudate; and the final water content is attained without a post-extrusion water reducing step.

Yet another aspect of the invention encompasses a method of producing a functionally enhancing flour, comprising: extruding a grain precursor having a water content of about 10% to about 15% at an extrusion pressure greater than about 1000 psi to yield a functionally enhancing flour with a final water content of about 4% to about 10%, wherein: the extruding step is carried out without thermal input beyond heat generated from a changing pressure of extrudate; and the final water content is attained without a post-extrusion water reducing step.

In certain methods, the grain precursor is a whole grain. Alternatively, the grain precursor is milled, or is a mixture of whole and milled grains.

The grain precursor is, in certain methods of the invention, made of only a single grain. Alternatively, the grain precursor is a mixture of two or more grains.

The grain precursor can consist of only a whole grain, milled grain, or mixture thereof, or, alternatively, the grain precursor includes additional ingredients including an additional cereal grain, legume, fruit, vegetable, whey, proteins, such as protein isolates, vitamins, or mineral and nutrients.

High extrusion pressures are characteristic of methods according to this invention, and flours are accordingly provided at, depending on particular flour embodiment, extrusion pressure ranges of about 2000 psi to about 20,000 psi, about 5000 psi to about 15,000 psi, or about 7500 psi to about 12,500 psi. Various embodiments utilize extrusion pressures greater than about 2000 psi, greater than about 3000 psi, greater than about 4000 psi, greater than about 5000 psi, or greater than about 10,000 psi.

Certain methods of the invention include a step of reducing the flour to a prescribed particle size distribution in a post-extrusion step.

Preferred methods according to the invention utilize a single screw extruder in the extrusion step.

A further aspect of the invention is directed to a method of manufacturing a food product, the method including a step of incorporating into the food product a functionally enhanced flour as described and claimed herein to modify one or more qualities of the food product selected from the group consisting of: cold water solubility in said food product; water absorption in said food product; oil absorption in said food product; flavor stability in said food product; nutrient availability in said food product; microbial activity in said food product; and fungal activity in said food product.

The invention further encompasses a food product that includes a functionally enhanced flour as described and claimed herein and at least one non-flour food ingredient.

Other objects, features and advantages of the present invention will become apparent after review of the specification, claims and drawings. The detailed description and examples enhance the understanding of the invention, but are not intended to limit the scope of the appended claims.

DRAWING DESCRIPTION

One or more preferred exemplary embodiments of the invention are illustrated in the accompanying drawings in which like reference numerals represent like parts throughout and in which.

DETAILED DESCRIPTION OF THE INVENTION

I. In General

Before the present materials and methods are described, it is understood that this invention is not limited to the particular methodology, protocols, materials, and reagents described, as these may vary. It is also to be understood that the terminology used herein is for the purpose of describing particular embodiments only, and is not intended to limit the scope of the present invention, which will be limited only by the appended claims.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the ingredients, reagents, chemicals, devices, manufactures, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. The Invention

The present invention is based on the inventor's discovery that extruding whole grains or milled grains in a low water, high pressure, and low heat dynamic can provide a functional flour having a variety of advantages over present flours, including one or more of: improved cold water starch solubility; reduced undesirable fiber content; lower water content; reduced flavor altering chemistries; stable nutrient, flavor additions that are relatively homogeneous, enhance flavors, improves digestibility and lowers bacterial and fungal activity.

Not adopting any one mode of operation herein, the present invention takes advantage of the phasing characteristics of water and starch under high extrusion pressures, particularly those achieved in a single screw extruder. The converted pressure drop observed under the present inventive methods provides enough energy to evaporate a portion of the water contained in the grain precursor and eliminates the need for added heating elements during the extrudate step of flour manufacture. While a minimal heat release is experienced in the pressure conversion, that heat is short lived in the process, and the reduced water content allows for near instant solidification of starch contained in the grain precursor that has been expanded by the vaporized water at the die of the extruder. This high-pressure technique of extrusion as a flour precursor provides an improved approach to flour manufacturing methodology. Performing the inventive methods described herein with a single screw extruder, versus the typically-used twin screw extruder, limits the length of time that gelatinization takes place and minimizes adverse consequences on the extruded material. In fact, typical extrusion equipment used in food manufacturing have not operated at the high pressures, low temperature or low water activity utilized by the present invention. The manufacturing conditions described herein are outside the normal expectation or application of present day food manufacturing equipment.

While the present inventive methods may utilize a singular grain as a precursor grain, certain embodiments of the invention encompass functional flours provided by methods that include a pre-extrusion mixing of various other food elements with the grain, typically in a dehydrated state, to produce customizable and uniquely engineered flours that functionally enhance the products they are later designed to work with. Additional food elements include, but are not be limited to: other grains, legumes, fruits, vegetables, whey, proteins, such as protein isolates, vitamins, or mineral and nutrients.

A resulting benefit of utilizing high pressure, low temperature, and low water extrusion as a precursor to a finished milled flour is that the expanded and cold water soluble structure increases the availability of nutrients to not only food making chemistries, but also to a consumer's digestive juices and enzymes upon consumption. Further, the flours are characterized by a longer shelf life without the additional use of undesired preservatives or applied heat; due to the low water activity without the use of any additional drying process or water elimination.

Overall, functionally enhanced flours according to the invention bestow one or more of the following advantages on food products incorporating that flour: lower water content; greater product stability and shelf life expectancy; improved cold water absorption and solubility; less nutrient loss to fiber creation; reduced microbial and fungal growth concerns; near homogeneous mixtures with various other forms of specialty food ingredients in a stable flour form; unique specialty flour creations; enhanced flavor control and stability; enhanced dispersion of a homogeneous blend of multiple ingredients; and enhanced digestibility for human and animal consumption.

In accordance with one embodiment of the invention, the functionally enhanced flour may be formed initially through the extrusion of a starch-containing material, preferably starch-containing admixture, using a method of making functionally enhanced flour in accordance with the present invention producing extruded grain precursor containing about 10% to about 15% water content, by pellet weight.

As discussed in more detail below, flour made in accordance with the present invention exhibits a water content in the functionally enhanced flour grain precursor of about 10% to 15% that is subject to extrusion at an extrusion pressure of greater than about 1000 psi absent the addition of thermal input beyond heat generated form a changing pressure of extrudate. The final water content in the functionally enhanced flour of about 4% to 10% after extrusion of the grain precursor is attained absent the addition of a post-extrusion water introduction or a post-extrusion water reducing manufacturing step.

The starch-containing material preferably is a starch-containing admixture composed of one or more cereal grains, such as one or more of corn, and wheat sorghum, which can be in whole grain form, milled, de-hulled or de-corticated form, de-germed form, and/or comminuted or ground, or a mixture thereof. In another embodiment of the present invention, the functionally enhanced flour is a is a starch-containing admixture composed of one or more cereal grains, such as one or more of corn, wheat and/or sorghum and an additional cereal grain, legume, namely, sweet purple potato, Okinawa sweet potato, *dioscorea alata* or purple yam, fruit, vegetable, whey, proteins, vitamins, minerals, and/or nutrients.

The starch-containing material or starch-containing admixture preferably is extruded from a single screw extruder, preferably a 50 horsepower or 100 horsepower single screw extruder, at a residency time or cooking time of no greater than 12 seconds, preferably between 4-11 seconds, and more preferably between 5-10 seconds, at an extruder pressure and/or extruder die pressure of at least 1000 pounds per square inch, and at an extruder temperature of approximately at least 125 degrees Celsius. The main screw of the extruder preferably rotates at a speed of 300 rpm, with an auger rotating at approximately 35 rpm, with two knife blades. The capacity of the extruder is approximately between 270 pounds per hour and 280 pounds per hour, with batch sizes of approximately 50 pounds. In one preferred method and admixture, the extruder preferably has extruder die pressure of greater than about 2,000 pounds per square inch, greater than about 3,000 pounds per square inch, greater than about 4,000 pounds per square inch, greater than about 5,000 pounds per square inch, and/or greater than about 10,000 pounds per square. In one preferred method and admixture, the extruder preferably has extruder die pressure of greater than about 2,000 pounds per square inch to about 20,000 pounds per square inch. In another preferred method and admixture, the extruder preferably has extruder die pressure of greater than about 5,000 pounds per square inch to about 150,000 pounds per square inch. In one preferred method and admixture, the extruder preferably has extruder die pressure of greater than about 7,500 pounds per square inch to about 12,500 pounds per square inch.

In accordance with one embodiment of the method of manufacturing a functionally enhanced flour product according to the present invention, following extrusion, the resultant extrudates may be subject to milling. While the method of manufacturing of the present invention is not so limited, in one embodiment the extrudates are milled in a roller mill, as to emphasize shredding rather than crushing of the extrudates during the formation of the resultant functionally enhanced flour product. Use of the roller miller may also limit the addition of external energy, such as thermal and/or kinetic energy, into the extrudates, which may have the undesirable effect of denaturing starch molecules in the extrudates. In one embodiment of the invention, the extrudates are milled to a size that is well suited for use of the resultant functionally enhanced flour in the manufacture of a food product, in which the functionally enhanced flour is an ingredient. After milling, the resultant functionally enhanced flour may have an approximate average particle size of between 60 mesh and 100 mesh, and more preferably approximately an average of 80 mesh particle size. However, it should be understood the particle size of the functionally enhanced flour is not so limited, and that alternative particle sizes are considered well within the scope of the present invention; and, particularly for use in food products that benefit from such alternative flour particle size.

In one preferred admixture formulation, the starch-containing admixture is composed of at least 80% whole grain de-hulled or de-corticated sorghum, can be composed of as much as 20% sweet purple potato, with the admixture having a moisture content no greater than 15%, preferably no greater than 12%, by admixture weight. In one preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 14%, more preferably no greater than 12% water content, by admixture weight. No additional water or moisture preferably is added to the extruder during extruder operation. In one such preferred sorghum-based admixture formulation, the starch-containing admixture is composed substantially completely of whole grain de-hulled or de-corticated sorghum, preferably white sorghum, with the admixture having a moisture content no greater than 15%, preferably no greater than 13%, more preferably no greater than 11%, by admixture weight with no water added to the admixture prior to or during extruder operation.

The extrusion formed functionally enhanced flour preferably provides fluid absorption when the flour is utilized as an ingredient in the formation of a food product. Preferably fluid absorption includes, but is not limited to, increased water absorption, increased oil absorption, and/or increased cold water absorption as compared to a comparable non-extrusion formed flour. A method of manufacturing a food product including the functionally enhanced flour is further provided, as to modify one or more qualities of the food product, including: increasing water absorption, increasing oil absorption, increased cold water absorption; improving flavor stability in the food product; improving nutrient availability in the food product; inhibiting microbial activity in the food product; inhibiting fungal activity in the food product, and/or, improving nutrient and/or protein digestibility in the food product as compared to a comparable food product formed of non-extrusion formed functionally enhanced flour. In one embodiment of the method of manufacturing a food product including the functionally enhanced flour and at least one non-flour food ingredient is combined with the extrusion formed functionally enhanced flour as the present invention, and the resultant food product is characterized by enhanced digestibility of nutrients and protein.

The extrusion formed functionally enhanced flour preferably provides a cold-water solubility when the flour is utilized as an ingredient in the formation a food product. The flour may include a cold-water soluble binder that is water soluble at temperatures below the gelatinization temperature of the type of starch in the admixture from which the binder is formed during extrusion. In a preferred method and embodiment, the water-soluble binder formed in the functionally enhanced flour from starch in the admixture during extrusion preferably is a cold-water soluble binder that is water soluble at temperatures below 60 degrees Celsius or 140 degrees Fahrenheit. In one preferred method and embodiment, the water-soluble binder formed in the functionally enhanced flour from sorghum starch in a sorghum-containing admixture during extrusion preferably is a cold-water soluble binder that is water soluble at temperatures below the gelatinization temperature of sorghum starch and preferably is water soluble at temperatures below 60 degrees Celsius or 140 degrees Fahrenheit.

The present invention can employ the extruding methods and/or equipment, use the starch-containing admixture formulations, and/or process resultant extrudates in accordance with those disclosed or otherwise described in commonly owned U.S. application Ser. Nos. 13/842,534, 13/868,073, 13/868,084, 14/426,483, 14/605,045, 14/656,086, 14/656,692, 14/668,975, and 15/445,977, respectively published as U.S. Patent Application Publication Nos. US20140069344, US20140069345, US20140069346, US20150238931, US20150145164, US20150181832, US20150181834, and US20150196005, which are hereby expressly incorporated herein by reference.

In addition, it is also contemplated that the present methods can be incorporated into and/or used with the extrusion methods, systems, production lines, equipment and/or extruders disclosed in one or more of U.S. application Ser. Nos. 13/842,534, 13/868,073, 13/868,084, 14/426,483, 14/605,045, 14/656,086, 14/656,692, 14/668,975, and 15/445,977, respectively published as U.S. Patent Application Publication Nos. US20140069344, US20140069345, US20140069346, US20150238931, US20150145164, US20150181832, US20150181834, US20150196005, and US20170188540 in accordance with the present invention including with respect to implementation and/or carrying out the present invention, including one or more of the pre- or post-extrusion processing devices, machines and/or mills.

III. Examples

In this section, the inventors describe various materials, methods and results related to and supportive of the present invention.

Example 1: Extruded Flour Manufacturing

In accordance with Example One, the inventors carried out four manufacturing trials using the below described weight percentages of ground sorghum and sweet purple potato as grain precursors to yield flours according to the invention after extrusion processing through an Advantage 50 Single Screw Extruder configured with: a screw and stator of 9 inch L.D. shallow lead style, single flow plate L.D., Die 154 hole, 0.05" hole diameter. Extruder operating parameters for each trial are provided in their respective columns of Table 1 below, where the die pressure and capacity of the extruder varied, as indicated, while the extruder's main screw speed, auger sped, knife blade number and batch size remained constant amongst all four trials.

TABLE 1

Extruded Flour Manufacturing Trials

| | Trial 1 | Trial 2 | Trial 3 | Trial 4 |
|---|---|---|---|---|
| Ingredient | wt % | wt % | wt % | wt % |
| Ground Sorghum | 80 | 60 | 90 | 100 |
| Sweet Purple Potato | 20 | 40 | 10 | 0 |
| Additional Water | 0 | 0 | 0 | 0 |

Extrusion Parameters

| | | | |
|---|---|---|---|
| Main screw. 300 rpm | Main screw. 300 rpm | Main screw. 300 rpm | Main screw. 300 rpm |
| Auger. 35 rpm | Auger. 35 rpm | Auger. 35 rpm | Auger. 35 rpm |
| Knife 2 blades. | Knife 2 blades. | Knife 2 blades. | Knife 2 blades. |
| N/A | N/A | N/A | N/A |
| Batch size. 50 Lbs. | Batch size. 50 Lbs. | Batch size. 50 Lbs. | Batch size. 50 Lbs. |
| Die pressure: 4200 psi | Die pressure: 3900-4000 psi | Die pressure: 4000-4100 psi | Die pressure: 4400 psi |
| Capacity: 280 lb/hr | Capacity: 275 lb/hr | Capacity: 270 lb/hr | Capacity: 280 lb/hr |

Example 2: Blood Glucose Response to High Pressure Extruded Flour

Turning now to Example 3, four trial participants were selected from a group of generally healthy males between the ages of 21-50 years with a Body Mass Index of between 18.5 to 35. Following an overnight fast, each participant arrived at the Ragle Human Nutrition Research Center on the UC Davis campus. A catheter was placed in the arm vein and blood was collected to establish a baseline (time=0). The trial participants were fed a volume of 0.5 cup of the high pressure extruded sorghum-based flour, standardized to the metabolic body size of each trial participant, where the high pressure extruded sorghum-based flour was manufactured according to one embodiment of the invention as identified in Table 1 and described above in example one. A blood glucose reading was recorded in mg/dl for each trial participant every fifteen minutes after feeding between 0 minutes and 90 minutes, and the results are shown below under the "Extruded Flour" column in Table 2. One week later and under the same protocol, the same four trial participants were also fed a volume of 0.5 cup of a control flour, having the same ingredients as the "Extruded Flour," but manufactured according to a conventional non-extruded method. A blood glucose reading was recorded in mg/dl for each trial participant every fifteen minutes after feeding between 0 minutes and 90 minutes, and the results are shown below under the "Control Flour" column in Table 2.

TABLE 2

Trail Participant Blood Glucose Readings

| Trial Subject Number | Time After Feeding (Minutes) | Blood Glucose (mg/dl) Extruded Flour | Blood Glucose (mg/dl) Control Flour |
|---|---|---|---|
| 1 | 0 | 89 | 80 |
| 1 | 15 | 129 | 99 |
| 1 | 30 | 137 | 119 |
| 1 | 45 | 115 | 111 |
| 1 | 60 | 113 | 96 |
| 1 | 75 | 104 | 93 |
| 1 | 90 | 101 | 91 |
| 2 | 0 | 93 | 98 |
| 2 | 15 | 127 | 109 |
| 2 | 30 | 160 | 123 |
| 2 | 45 | 164 | 121 |
| 2 | 60 | 149 | 114 |
| 2 | 75 | 132 | 108 |
| 2 | 90 | 119 | 103 |
| 3 | 0 | 95 | 82 |
| 3 | 15 | 139 | 86 |
| 3 | 30 | 157 | 107 |
| 3 | 45 | 148 | 119 |
| 3 | 60 | 127 | 128 |
| 3 | 75 | 126 | 134 |
| 3 | 90 | 126 | 132 |
| 4 | 0 | 86 | 92 |
| 4 | 15 | 109 | 92 |
| 4 | 30 | 136 | 106 |
| 4 | 45 | 129 | 107 |
| 4 | 60 | 115 | 101 |
| 4 | 75 | 93 | 93 |
| 4 | 90 | 67 | 88 |

Turning now to FIGS. 1-4, the extruded flour and control flour resulting blood glucose reading of each trial participant are compared respectively. As shown in graph 10 in FIG. 1, the extruded flour, identified by line 12, resulted in a higher blood glucose reading as compared to the control flour, identified by line 14, at all recording intervals over 90 minutes, with the largest relative increase occurring at approximately 15 minutes after feeding. In graph 16 in FIG. 2, the extruded flour, identified by line 18, resulted in a higher blood glucose reading for test participant 2 as compared to the control flour, identified by line 20, at all recording intervals between 15 and 90 minutes, with the largest relative increase occurring between 30 and 45 minutes after feeding. As shown in graph 22 in FIG. 3, the extruded flour, identified by line 24, resulted in a higher blood glucose reading for test participant 3 as compared to the control flour, identified by line 26, at all recording intervals between 0 and 45 minutes, with the largest relative increase occurring between 15 and 30 minutes after feeding. Finally, as shown in graph 28 in FIG. 4, the extruded flour, identified by line 30, resulted in a higher blood glucose reading for test participant 4 as compared to the control flour, identified by line 32, at all recording intervals between 15 and 60 minutes, with the largest relative increase occurring between 30 and 45 minutes after feeding. In sum, Table 2 and FIGS. 1-4 show that feeding of extruded flour according to one embodiment of the present invention generally results in a relatively higher initial blood glucose reading for each trial participant as compared to a non-extruded control flour during between approximately 0 and 60 minutes after feeding. This noted initial spike in relative blood glucose level returns to, on average, a blood glucose level of approximately equal to that noted in the non-extruded control flour between approximately 60-90 minutes after feeding. That is to say that the results shown in Table 2 and FIGS.

1-4 illustrate a more rapid glucose uptake into the blood of trial participants that are feed the extruded flour in accordance with one embodiment of the present invention, as compared with a control flour. The inventors believe that the expanded and/or broken structure of the sorghum material that results from the high-pressure extrusion process may result in the increased blood uptake of both glucose, and other large molecules. The high-pressure extrusion process may also render such molecules increasingly available for rapid enzyme interaction. Resultantly, the noted rapid increase in glucose uptake experiences in the extruded flour correlates to more rapid uptake of additional components of the extruded flour, such as macromolecules including protein digestibility.

Furthermore, the noted increase in blood uptake of glucose, as shown in Table 2, may be beneficially applied to rapidly replenishing glycogen levels for individuals that have diminished glycogen levels due to prolonged physical activity, such as exercise. That is to say that the high pressure extruded sorghum-based flour, manufactured according to one embodiment of the invention as identified in Table 1 and described above in example one, may be utilized as a nutritional supplement for use in increasing blood glucose levels and resultantly glycogen levels in an individual after exercise. Furthermore, such a high pressure extruded sorghum-based flour may also provide additional benefits such as the rapid uptake of additional macromolecules, including protein.

In addition to the blood glucose readings recorded in Table 2, for each of the four trial participants, blood samples were collected every fifteen minutes after feeding between 0 minutes and 90 minutes, and subject to a comprehensive metabolic testing panel. This testing included readings of Na (mEq/L), K (mEq/L), Cl (mEq/L), $CO_2$ (mEq/L), bun (mg/dL), creatinine (mg/dL), GFR, Ca (mg/dL), protein (g/dL), Albumin (g/dL), alk. phos. (U/L), ast. (U/L), total Bili (mg/dL), and atl. (U/L). The results are shown below in an individual table for each trial participant, comparing "Extruded Flour" to "Control Flour," indicating notable increase in the concentration of nutrients in blood samples of trial participants having been feed the high pressure extruded sorghum-based flour, manufactured according to one embodiment of the invention, as compared to the conventionally manufactured control flour.

TABLE 3

Trial Participant 1 Comprehensive Metabolic Screening

| | Extruded Flour | | | | | | | Control Flour | | | | | | |
|---|---|---|---|---|---|---|---|---|---|---|---|---|---|---|
| | \multicolumn{14}{c}{Mins After Feeding} | | | | | | | | | | | | | |
| | 0 | 15 | 30 | 45 | 60 | 75 | 90 | 0 | 15 | 30 | 45 | 60 | 75 | 90 |
| Na (mEq/L) | 136 | 136 | 135 | 135 | 135 | 133 | 134 | 138 | 134 | 136 | 136 | 136 | 137 | 135 |
| K (mEq/L) | 3.8 | 3.6 | 3.6 | 3.6 | 3.5 | 3.5 | 3.7 | 3.8 | 3.9 | 3.9 | 3.7 | 3.7 | 3.8 | 3.8 |
| Cl (mEq/L) | 105 | 106 | 106 | 105 | 105 | 104 | 104 | 107 | 103 | 104 | 105 | 10 | 106 | 105 |
| $CO_2$ (mEq/L) | 25 | 23 | 24 | 24 | 23 | 24 | 22 | 22 | 24 | 25 | 23 | 24 | 24 | 23 |
| bun (mg/dL) | 11 | 12 | 11 | 11 | 10 | 10 | 11 | 9 | 9 | 9 | 9 | 9 | 9 | 9 |
| creatinine (mg/dL) | 0.9 | 0.91 | 0.95 | 0.93 | 0.85 | 0.87 | 0.84 | 0.87 | 0.86 | 0.89 | 0.85 | 0.86 | 0.87 | 0.84 |
| GFR | >60 | >60 | >60 | >60 | >60 | >60 | >60 | >60 | >60 | >60 | >60 | >60 | >60 | >60 |
| Ca (mg/dL) | 8.9 | 8.9 | 8.9 | 9.0 | 8.9 | 8.7 | 8.9 | 8.9 | 94 | 9.1 | 9.1 | 9.0 | 9.1 | 8.9 |
| protein (g/dL) | 6.9 | 6.7 | 6.8 | 7.0 | 6.8 | 6.8 | 6.8 | 6.7 | 6.7 | 6.9 | 6.8 | 6.9 | 7.0 | 6.7 |
| Albumin (g/dL) | 3.7 | 3.7 | 3.7 | 3.9 | 3.6 | 3.8 | 3.7 | 3.8 | 3.9 | 3.8 | 3.8 | 3.8 | 3.8 | 3.7 |
| alk. phos. (U/L) | 100 | 97 | 97 | 97 | 99 | 92 | 96 | 96 | 95 | 95 | 96 | 95 | 98 | 96 |
| ast. (U/L) | 28 | 28 | 29 | 30 | 30 | 27 | 28 | 31 | 29 | 30 | 29 | 28 | 29 | 28 |
| total Bili (mg/dL) | 1.0 | 1.0 | 0.9 | 0.7 | 1.0 | 0.5 | 0.9 | 0.7 | 0.8 | 0.7 | 0.7 | 0.9 | 0.8 | 0.7 |
| atl. (U/L) | 27 | 27 | 28 | 28 | 27 | 27 | 26 | 24 | 25 | 25 | 25 | 25 | 25 | 25 |

TABLE 4

Trial Participant 2 Comprehensive Metabolic Screening

| | Extruded Flour | | | | | | | Control Flour | | | | | | |
|---|---|---|---|---|---|---|---|---|---|---|---|---|---|---|
| | \multicolumn{14}{c}{Mins After Feeding} | | | | | | | | | | | | | |
| | 0 | 15 | 30 | 45 | 60 | 75 | 90 | 0 | 15 | 30 | 45 | 60 | 75 | 90 |
| Na (mEq/L) | 138 | 139 | 136 | 138 | 139 | 138 | 138 | 140 | 138 | 138 | 137 | 137 | 136 | 139 |
| K (mEq/L) | 3.8 | 3.8 | 3.6 | 3.6 | 3.6 | 3.5 | 3.6 | 4.0 | 3.7 | 3.7 | 3.5 | 3.4 | 3.6 | 3.7 |
| Cl (mEq/L) | 107 | 108 | 105 | 108 | 108 | 107 | 107 | 103 | 105 | 103 | 105 | 105 | 104 | 106 |
| $CO_2$ (mEq/L) | 24 | 25 | 23 | 21 | 24 | 25 | 24 | 26 | 24 | 25 | 24 | 23 | 23 | 24 |
| bun (mg/dL) | 8 | 8 | 9 | 8 | 9 | 8 | 8 | 11 | 10 | 11 | 10 | 10 | 11 | 10 |
| creatinine (mg/dL) | .78 | .88 | .87 | .9 | .92 | .86 | .87 | .84 | .88 | .85 | .81 | .82 | .81 | .85 |
| GFR | >60 | >60 | >60 | >60 | >60 | >60 | >60 | >60 | >60 | >60 | >60 | >60 | >60 | >60 |
| Ca (mg/dL) | 8.9 | 9 | 8.8 | 8.9 | 9.0 | 8.9 | 9.0 | 9.3 | 9.2 | 9.1 | 9.1 | 9.2 | 9.3 | 9.3 |
| protein (g/dL) | 7 | 7 | 6.8 | 6.8 | 7 | 6.9 | 6.9 | 7.2 | 7.5 | 7.4 | 7.2 | 7.3 | 7.5 | 7.5 |
| Albumin (g/dL) | 4.3 | 4.4 | 4.3 | 4.3 | 4.4 | 4.3 | 4.4 | 4.6 | 4.6 | 4.6 | 4.5 | 4.5 | 4.6 | 4.6 |
| alk. phos. (U/L) | 119 | 115 | 115 | 114 | 118 | 117 | 116 | 116 | 112 | 113 | 110 | 111 | 112 | 112 |
| ast. (U/L) | 22 | 22 | 24 | 25 | 26 | 26 | 23 | 22 | 20 | 22 | 22 | 22 | 20 | 19 |
| total Bili (mg/dL) | 1.3 | 1.4 | 1.2 | 1.4 | 1.5 | 1.5 | 1.5 | 1.2 | 1.2 | 1.3 | 1.1 | 1.1 | 1.2 | 1.4 |
| atl. (U/L) | 21 | 23 | 20 | 22 | 21 | 21 | 22 | 18 | 18 | 18 | 18 | 17 | 19 | 18 |

TABLE 5

Trial Participant 3 Comprehensive Metabolic Screening

| | Extruded Flour | | | | | | | Control Flour | | | | | | |
|---|---|---|---|---|---|---|---|---|---|---|---|---|---|---|
| | | | | | | | Mins After Feeding | | | | | | | |
| | 0 | 15 | 30 | 45 | 60 | 75 | 90 | 0 | 15 | 30 | 45 | 60 | 75 | 90 |
| Na (mEq/L) | 135 | 135 | 134 | 136 | 134 | 136 | 135 | 139 | 138 | 138 | 137 | 137 | 137 | 136 |
| K (mEq/L) | 4.2 | 3.9 | 13.8 | 3.8 | 4.0 | 4.0 | 4.1 | 4.4 | 4.4 | 4.3 | 4.2 | 4.1 | 4.0 | 4.2 |
| Cl (mEq/L) | 104 | 104 | 103 | 105 | 103 | 105 | 103 | 104 | 102 | 104 | 102 | 102 | 103 | 101 |
| $CO_2$ (mEq/L) | 21 | 20 | 21 | 21 | 21 | 22 | 22 | 28 | 76 | 25 | 25 | 26 | 25 | 24 |
| bun (mg/dL) | 11 | 11 | 9 | 10 | 10 | 10 | 10 | 19 | 19 | 19 | 19 | 19 | 19 | 19 |
| creatinine (mg/dL) | .79 | .83 | .84 | .87 | .87 | .87 | .89 | 1.27 | 1.29 | 1.26 | 1.21 | 1.2 | 1.22 | 1.15 |
| GFR | >60 | >60 | >60 | >60 | >60 | >60 | >60 | >60 | >60 | >60 | >60 | >60 | >60 | >60 |
| Ca (mg/dL) | 9.2 | 9.2 | 9.1 | 9.2 | 9.2 | 9.4 | 9.3 | 9.5 | 9.5 | 9.5 | 9.4 | 9.4 | 9.4 | 9.3 |
| protein (g/dL) | 7.6 | 7.7 | 7.5 | 7.6 | 7.8 | 7.7 | 7.9 | 7.1 | 7 | 7.3 | 7 | 6.9 | 7 | 7.3 |
| Albumin (g/dL) | 4.2 | 4.3 | 4.2 | 4.3 | 44 | 4.4 | 4.4 | 4.6 | 4.6 | 4.5 | 4.5 | 4.5 | 1.4 | 4.7 |
| alk. phos. (U/L) | 80 | 80 | 79 | 82 | 83 | 82 | 81 | 42 | 42 | 40 | 42 | 41 | 40 | 42 |
| ast. (U/L) | 27 | 26 | 25 | 27 | 28 | 27 | 25 | 21 | 21 | 21 | 18 | 20 | 19 | 21 |
| total Bili (mg/dL) | .5 | .5 | .6 | .6 | .5 | .6 | .5 | 1.7 | 1.7 | 1.7 | 1.7 | 1.8 | 1.6 | 1.6 |
| atl. (U/L) | 28 | 28 | 26 | 27 | 27 | 27 | 27 | 17 | 17 | 17 | 17 | 17 | 16 | 18 |

TABLE 6

Trial Participant 4 Comprehensive Metabolic Screening

| | Extruded Flour | | | | | | | Control Flour | | | | | | |
|---|---|---|---|---|---|---|---|---|---|---|---|---|---|---|
| | | | | | | | Mins After Feeding | | | | | | | |
| | 0 | 15 | 30 | 45 | 60 | 75 | 90 | 0 | 15 | 30 | 45 | 60 | 75 | 90 |
| Na (mEq/L) | 138 | 137 | 135 | 138 | 137 | 138 | 137 | 140 | 140 | 139 | 139 | 137 | 138 | 138 |
| K (mEq/L) | 3.9 | 4.1 | 3.7 | 3.6 | 4.0 | 4.3 | 3.7 | 4.1 | 4.1 | 4.1 | 3.9 | 4.0 | 4.0 | 4.0 |
| Cl (mEq/L) | 105 | 104 | 103 | 104 | 104 | 104 | 103 | 100 | 107 | 106 | 107 | 105 | 107 | 106 |
| $CO_2$ (mEq/L) | 22 | 22 | 26 | 25 | 25 | 26 | 28 | 22 | 21 | 26 | 27 | 27 | 23 | 22 |
| bun (mg/dL) | 15 | 14 | 15 | 14 | 14 | 14 | 14 | 10 | 9 | 10 | 10 | 10 | 9 | 9 |
| creatinine (mg/dL) | 1.2 | 1.24 | 1.22 | 1.23 | 1.23 | 1.24 | 1.28 | .8 | .84 | .86 | .83 | .82 | .8 | .79 |
| GFR | >60 | >60 | >60 | >60 | >60 | >60 | >60 | >60 | >60 | >60 | >60 | >60 | >60 | >60 |
| Ca (mg/dL) | 9.2 | 9.2 | 8.9 | 9.1 | 9.2 | 9.4 | 9.2 | 9.2 | 9.3 | 9.2 | 9.2 | 9.2 | 9.2 | 9.2 |
| protein (g/dL) | 6.9 | 6.7 | 6.6 | 6.6 | 6.7 | 6.9 | 7.0 | 7.2 | 7.7 | 7.5 | 7.6 | 7.5 | 7.6 | 7.5 |
| Albumin (g/dL) | 4.4 | 4.3 | 4.2 | 4.2 | 4.3 | 4.4 | 4.4 | 4.2 | 4.3 | 4.3 | 4.3 | 4.3 | 4.2 | 4.2 |
| alk. phos. (U/L) | 37 | 37 | 36 | 36 | 38 | 38 | 39 | 77 | 78 | 78 | 78 | 78 | 76 | 75 |
| ast. (U/L) | 25 | 21 | 21 | 21 | 21 | 23 | 23 | 28 | 27 | 28 | 27 | 27 | 26 | 27 |
| total Bili (mg/dL) | 1.3 | 1.2 | 1.3 | 1.1 | 1.2 | 1.2 | 1.2 | .6 | .7 | .6 | .5 | .5 | .5 | .6 |
| atl. (U/L) | 19 | 19 | 18 | 19 | 19 | 18 | 18 | 29 | 30 | 30 | 30 | 29 | 30 | 30 |

Example 3: Enhanced Protein Availability from High Pressure Extruded Flour

As indicated above in Table 3-6, the comprehensive metabolic screening included, amongst others, a reading of total protein (g/dL) in the blood of each trail participant collected every fifteen minutes after feeding between 0 minutes and 90 minutes. In addition to this general reading of total protein, blood samples of two trial participant underwent further testing after undergoing the sample testing protocol outlined in Example 2, above. That is to say, in Example 3, two trial participants were selected from a group of generally healthy males between the ages of 21-50 years with a Body Mass Index of between 18.5 to 35. Following an overnight fast, each participant arrived at the Ragle Human Nutrition Research Center on the UC Davis campus. A catheter was placed in the arm vein and blood was collected to establish a baseline (time=0). The trial participants were fed a volume of 0.5 cup of the high pressure extruded sorghum-based flour standardized to the metabolic body size of each trial participant, where the high pressure extruded sorghum-based flour is manufactured according to one embodiment of the invention as identified in Table 1 and described above in example one. A blood sample was collected from the trial participant every thirty minutes after feeding between 0 minutes and 180 minutes, and testing of the concentration of availability in nMol/mL of the following amino acids in the trial participants blood plasma was collected and recorded: Taurine, L-Aspartic Acid, L-Threonine, L-Serine, L-Asparagine, L-Glutamic Acid, L-Glutamine, Glycine, L-Alanine, L-Citrulline, L-a-Aminobutyric Acid, L-Valine, L-cycstine, L-Methionine, L-Isoleucine, L-Leucine, L-Tyrosine, L-Phenylalanine, L-Ornithine, L-Lysine, 1-Methyl-L-Histidine, L-Histidine, Tryptophan, 3-Methyl-L-histidine, L-Arginine, and L-Proline. The results are shown below under the "Extruded Flour" column in Table 7. One week later, the same trial participant, under the same procedures were also fed a volume of 0.5 cup of a control flour, having the same ingredients as the "Extruded Flour," but manufactured according to a conventional non-extruded method. A blood sample was collected from the trial participant every thirty minutes after feeding between 0 minutes and 180 minutes and testing of the concentration of amino acid in blood plasma, i.e., availability, in nMol/ml was collected and recorded, with the results are shown below under the "Control Flour" column in Table 7.

TABLE 7

Trail Participant Blood Protein Availability Readings

| Amino Acid | Time After Feeding (Minutes) | Trial Participant 1 Amino Acid (nMol/ml) | | Trial Participant 2 Amino Acid (nMol/ml) | |
|---|---|---|---|---|---|
| | | Extruded Flour | Control Flour | Extruded Flour | Control Flour |
| Taurine | 0 | 42 | 37 | 46 | 49 |
| Taurine | 30 | 34 | 37 | 45 | 46 |
| Taurine | 60 | 35 | 33 | 44 | 43 |
| Taurine | 90 | 34 | 34 | 39 | 44 |
| Taurine | 120 | 34 | 35 | 43 | 44 |
| Taurine | 180 | 33 | 33 | 40 | 46 |
| L-Aspartic Acid | 0 | 6 | 4 | 3 | 5 |
| L-Aspartic Acid | 30 | 5 | 3 | 3 | 4 |
| L-Aspartic Acid | 60 | 5 | 4 | 3 | 4 |
| L-Aspartic Acid | 90 | 5 | 4 | 4 | 5 |
| L-Aspartic Acid | 120 | 4 | 4 | 4 | 5 |
| L-Aspartic Acid | 180 | 4 | 4 | 3 | 5 |
| L-Threonine | 0 | 141 | 124 | 138 | 127 |
| L-Threonine | 30 | 123 | 120 | 139 | 128 |
| L-Threonine | 60 | 118 | 119 | 124 | 120 |
| L-Threonine | 90 | 113 | 117 | 115 | 121 |
| L-Threonine | 120 | 118 | 118 | 120 | 115 |
| L-Threonine | 180 | 118 | 110 | 119 | 116 |
| L-Serine | 0 | 112 | 112 | 114 | 108 |
| L-Serine | 30 | 111 | 120 | 121 | 115 |
| L-Serine | 60 | 107 | 116 | 109 | 111 |
| L-Serine | 90 | 103 | 117 | 103 | 107 |
| L-Serine | 120 | 105 | 116 | 109 | 103 |
| L-Serine | 180 | 112 | 111 | 114 | 103 |
| L-Asparagine | 0 | 81 | 81 | 57 | 59 |
| L-Asparagine | 30 | 79 | 83 | 61 | 63 |
| L-Asparagine | 60 | 78 | 83 | 57 | 58 |
| L-Asparagine | 90 | 78 | 84 | 52 | 55 |
| L-Asparagine | 120 | 74 | 89 | 56 | 55 |
| L-Asparagine | 180 | 80 | 79 | 53 | 59 |
| L-Glutamic Acid | 0 | 22 | 20 | 23 | 32 |
| L-Glutamic Acid | 30 | 48 | 37 | 38 | 44 |
| L-Glutamic Acid | 60 | 44 | 36 | 38 | 42 |
| L-Glutamic Acid | 90 | 42 | 37 | 37 | 42 |
| L-Glutamic Acid | 120 | 25 | 35 | 41 | 40 |
| L-Glutamic Acid | 180 | 27 | 29 | 39 | 38 |
| L-Glutamine | 0 | 652 | 620 | 603 | 641 |
| L-Glutamine | 30 | 611 | 597 | 606 | 631 |
| L-Glutamine | 60 | 582 | 599 | 589 | 623 |
| L-Glutamine | 90 | 571 | 590 | 543 | 600 |
| L-Glutamine | 120 | 583 | 588 | 583 | 629 |
| L-Glutamine | 180 | 593 | 564 | 594 | 639 |
| Glycine | 0 | 215 | 197 | 265 | 253 |
| Glycine | 30 | 200 | 195 | 260 | 247 |
| Glycine | 60 | 195 | 195 | 250 | 243 |
| Glycine | 90 | 197 | 200 | 234 | 232 |
| Glycine | 120 | 197 | 205 | 247 | 239 |
| Glycine | 180 | 204 | 199 | 245 | 242 |
| L-Alanine | 0 | 383 | 325 | 369 | 337 |
| L-Alanine | 30 | 319 | 283 | 315 | 285 |
| L-Alanine | 60 | 317 | 272 | 311 | 293 |
| L-Alanine | 90 | 309 | 279 | 292 | 279 |
| L-Alanine | 120 | 315 | 282 | 299 | 280 |
| L-Alanine | 180 | 298 | 263 | 277 | 272 |
| L-Citrulline | 0 | 29 | 23 | 30 | 33 |
| L-Citrulline | 30 | 27 | 23 | 25 | 32 |
| L-Citrulline | 60 | 25 | 24 | 26 | 34 |
| L-Citrulline | 90 | 27 | 24 | 27 | 32 |
| L-Citrulline | 120 | 21 | 25 | 31 | 34 |
| L-Citrulline | 180 | 21 | 22 | 30 | 32 |
| L-a-Aminobutyric Acid | 0 | 27 | 25 | 33 | 40 |
| L-a-Aminobutyric Acid | 30 | 27 | 26 | 36 | 39 |
| L-a-Aminobutyric Acid | 60 | 23 | 25 | 30 | 37 |
| L-a-Aminobutyric Acid | 90 | 25 | 27 | 30 | 33 |
| L-a-Aminobutyric Acid | 120 | 20 | 27 | 33 | 34 |
| L-a-Aminobutyric Acid | 180 | 21 | 25 | 30 | 35 |
| L-Valine | 0 | 277 | 241 | 263 | 311 |
| L-Valine | 30 | 268 | 251 | 286 | 315 |
| L-Valine | 60 | 254 | 240 | 253 | 296 |
| L-Valine | 90 | 247 | 242 | 234 | 275 |
| L-Valine | 120 | 229 | 241 | 247 | 277 |
| L-Valine | 180 | 234 | 223 | 247 | 275 |
| L-Cycstine | 0 | 52 | 46 | 52 | 60 |
| L-Cycstine | 30 | 51 | 46 | 59 | 60 |
| L-Cycstine | 60 | 53 | 46 | 62 | 60 |
| L-Cycstine | 90 | 48 | 46 | 54 | 57 |
| L-Cycstine | 120 | 46 | 47 | 57 | 57 |
| L-Cycstine | 180 | 44 | 49 | 59 | 52 |
| L-Methionine | 0 | 31 | 31 | 29 | 26 |
| L-Methionine | 30 | 27 | 28 | 28 | 25 |
| L-Methionine | 60 | 28 | 27 | 24 | 23 |
| L-Methionine | 90 | 27 | 28 | 22 | 24 |
| L-Methionine | 120 | 26 | 28 | 22 | 22 |
| L-Methionine | 180 | 30 | 24 | 23 | 22 |
| L-Isoleucine | 0 | 71 | 61 | 63 | 81 |
| L-Isoleucine | 30 | 67 | 67 | 66 | 85 |
| L-Isoleucine | 60 | 64 | 62 | 55 | 75 |
| L-Isoleucine | 90 | 60 | 63 | 48 | 66 |
| L-Isoleucine | 120 | 54 | 60 | 51 | 66 |
| L-Isoleucine | 180 | 57 | 53 | 55 | 63 |
| L-Leucine | 0 | 133 | 123 | 132 | 150 |
| L-Leucine | 30 | 134 | 136 | 147 | 162 |
| L-Leucine | 60 | 130 | 130 | 126 | 150 |
| L-Leucine | 90 | 132 | 137 | 119 | 142 |
| L-Leucine | 120 | 120 | 139 | 132 | 142 |
| L-Leucine | 180 | 129 | 126 | 136 | 142 |
| L-Norleucine | 0 | 200 | 200 | 201 | 200 |
| L-Norleucine | 30 | 200 | 200 | 201 | 200 |
| L-Norleucine | 60 | 200 | 200 | 201 | 200 |
| L-Norleucine | 90 | 200 | 200 | 200 | 200 |
| L-Norleucine | 120 | 200 | 200 | 200 | 200 |
| L-Norleucine | 180 | 00 | 200 | 200 | 200 |
| L-Tyrosine | 0 | 66 | 55 | 61 | 53 |
| L-Tyrosine | 30 | 58 | 53 | 54 | 50 |
| L-Tyrosine | 60 | 58 | 51 | 49 | 50 |
| L-Tyrosine | 90 | 54 | 51 | 49 | 45 |
| L-Tyrosine | 120 | 51 | 51 | 47 | 46 |
| L-Tyrosine | 180 | 50 | 47 | 46 | 48 |
| L-Phenylalanine | 0 | 69 | 58 | 55 | 63 |
| L-Phenylalanine | 30 | 61 | 59 | 56 | 63 |
| L-Phenylalanine | 60 | 66 | 57 | 52 | 55 |
| L-Phenylalanine | 90 | 65 | 59 | 48 | 56 |
| L-Phenylalanine | 120 | 61 | 60 | 52 | 59 |
| L-Phenylalanine | 180 | 60 | 56 | 50 | 55 |
| L-Ornithine | 0 | 33 | 29 | 42 | 51 |
| L-Ornithine | 30 | 33 | 32 | 52 | 56 |
| L-Ornithine | 60 | 30 | 31 | 44 | 51 |
| L-Ornithine | 90 | 32 | 32 | 41 | 48 |
| L-Ornithine | 120 | 30 | 33 | 44 | 50 |
| L-Ornithine | 180 | 30 | 30 | 43 | 48 |
| L-Lysine | 0 | 143 | 144 | 207 | 201 |
| L-Lysine | 30 | 137 | 147 | 199 | 211 |
| L-Lysine | 60 | 127 | 141 | 184 | 196 |
| L-Lysine | 90 | 131 | 146 | 172 | 186 |
| L-Lysine | 120 | 133 | 146 | 185 | 194 |
| L-Lysine | 180 | 140 | 142 | 180 | 193 |
| 1-Methyl-L-Histidine | 0 | 3 | 15 | 48 | 63 |
| 1-Methyl-L-Histidine | 30 | 4 | 15 | 48 | 60 |
| 1-Methyl-L-Histidine | 60 | 3 | 14 | 48 | 58 |
| 1-Methyl-L-Histidine | 90 | 3 | 14 | 43 | 56 |
| 1-Methyl-L-Histidine | 120 | 3 | 13 | 45 | 57 |
| 1-Methyl-L-Histidine | 180 | 3 | 12 | 43 | 55 |

TABLE 7-continued

Trail Participant Blood Protein Availability Readings

| Amino Acid | Time After Feeding (Minutes) | Trial Participant 1 Amino Acid (nMol/ml) | | Trial Participant 2 Amino Acid (nMol/ml) | |
|---|---|---|---|---|---|
| | | Extruded Flour | Control Flour | Extruded Flour | Control Flour |
| L-Histidine | 0 | 84 | 83 | 84 | 88 |
| L-Histidine | 30 | 85 | 82 | 87 | 88 |
| L-Histidine | 60 | 81 | 82 | 84 | 86 |
| L-Histidine | 90 | 80 | 82 | 77 | 84 |
| L-Histidine | 120 | 79 | 83 | 84 | 87 |
| L-Histidine | 180 | 85 | 80 | 85 | 88 |
| Tryptophan | 0 | 63 | 58 | 50 | 64 |
| Tryptophan | 30 | 61 | 52 | 58 | 61 |
| Tryptophan | 60 | 62 | 56 | 60 | 59 |
| Tryptophan | 90 | 58 | 59 | 59 | 58 |
| Tryptophan | 120 | 49 | 58 | 59 | 61 |
| Tryptophan | 180 | 52 | 47 | 60 | 57 |
| 3-Methyl-L-histidine | 0 | 5 | 8 | 8 | 8 |
| 3-Methyl-L-histidine | 30 | 5 | 8 | 7 | 7 |
| 3-Methyl-L-histidine | 60 | 4 | 7 | 9 | 8 |
| 3-Methyl-L-histidine | 90 | 6 | 8 | 6 | 6 |
| 3-Methyl-L-histidine | 120 | 6 | 7 | 9 | 6 |
| 3-Methyl-L-histidine | 180 | 8 | 5 | 7 | 7 |
| L-Arginine | 0 | 80 | 80 | 103 | 108 |
| L-Arginine | 30 | 79 | 84 | 107 | 118 |
| L-Arginine | 60 | 77 | 84 | 103 | 108 |
| L-Arginine | 90 | 80 | 94 | 96 | 105 |
| L-Arginine | 120 | 77 | 84 | 101 | 108 |
| L-Arginine | 180 | 78 | 80 | 99 | 107 |
| Proline | 0 | 217 | 190 | 289 | 286 |
| Proline | 30 | 130 | 171 | 258 | 277 |
| Proline | 60 | 134 | 167 | 248 | 275 |
| Proline | 90 | 125 | 174 | 232 | 254 |
| Proline | 120 | 165 | 162 | 251 | 279 |
| Proline | 180 | 168 | 148 | 239 | 263 |

As can be seen in the data of Table 7, L-Glutamic Acid, which is the largest amino acid component in sorghum exhibited a marked increase in blood plasma availability during the testing period, thereby affirming that digestion and intestinal absorption are taking place in both trial participants. A common characteristic amongst these amino acid blood plasma availability tests indicates that average rate of availability over the course of 0 to 30 minutes is on average greater after having been feed the extruded flour, in accordance with one embodiment of the present invention, as compared to the control flour. The average greater value or positive slope of availability over the course of 0 to 30 minutes is indicative of ongoing amino acid absorption into the blood.

Also of note, is that the decline in blood plasma availability of amino acids, shown in Table 7, for the extruded flour is of a greater magnitude than that of the control flour. The decline or negative slope is believed to be indicative of signaling mechanisms that impacts the cellular uptake of these amino acids. That is to say, that readily available amino acids in the blood, resulting from feeding of the extruded flour are rapidly absorbed by the cells, thereby resulting in a more rapid decline in blood plasma availability of the corresponding amino acids.

Figure 1:
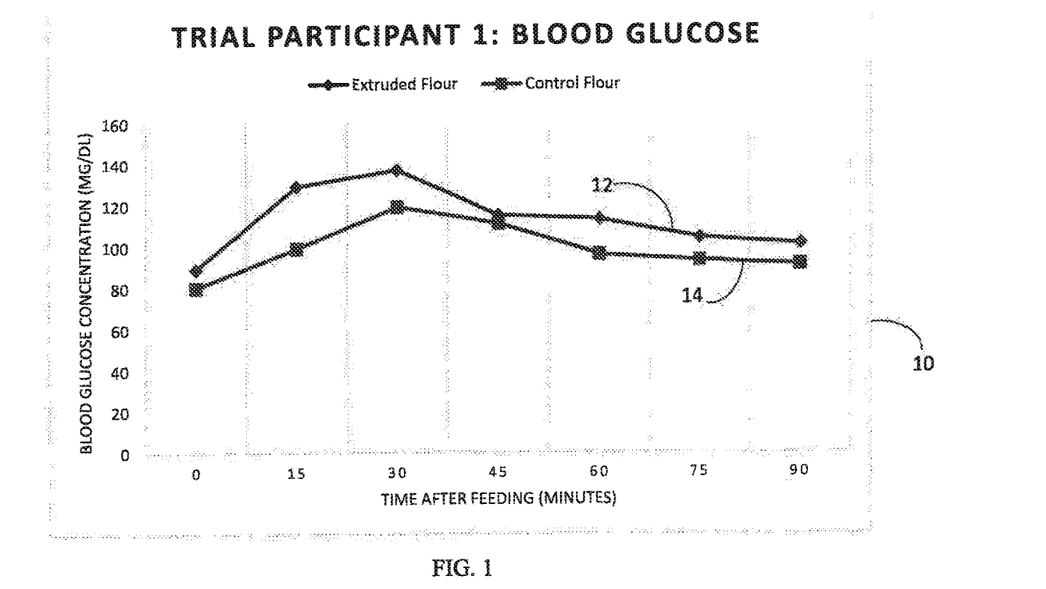
FIG. 1 is a graph showing the blood glucose level (mg/dl) of a first trial participant at times between 0 and 90 minutes after having been fed a sample of an extruded sorghum-based flour according to one embodiment of the present invention, and subsequently a non-extruded sorghum-based control flour.
Figure 2:
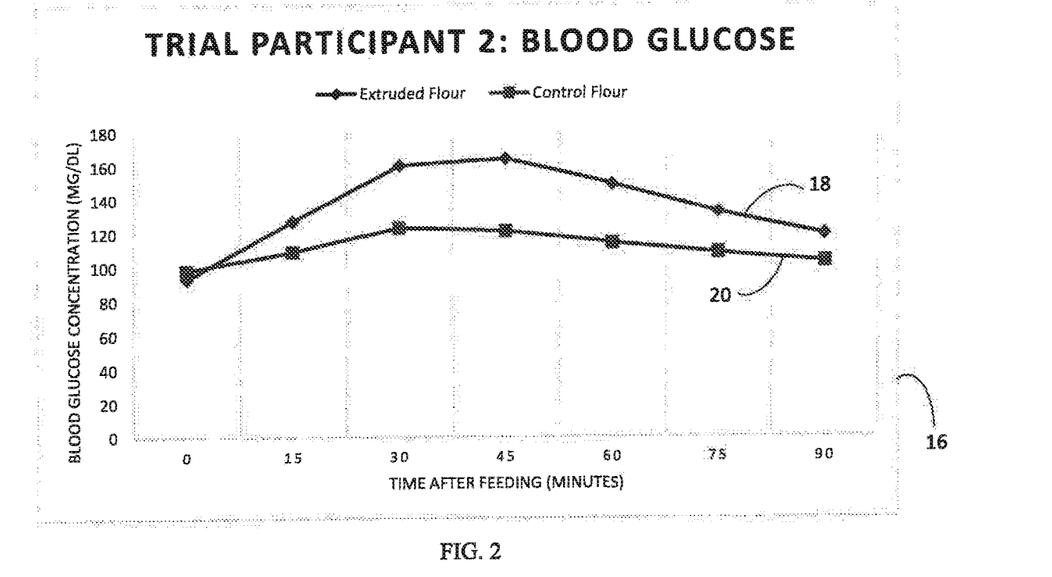
FIG. 2 is a graph showing the blood glucose level (mg/dl) of a second trial participant at times between 0 and 90 minutes after having been fed a sample of an extruded sorghum-based flour according to one embodiment of the present invention, and subsequently a non-extruded sorghum-based control flour.
Figure 3:
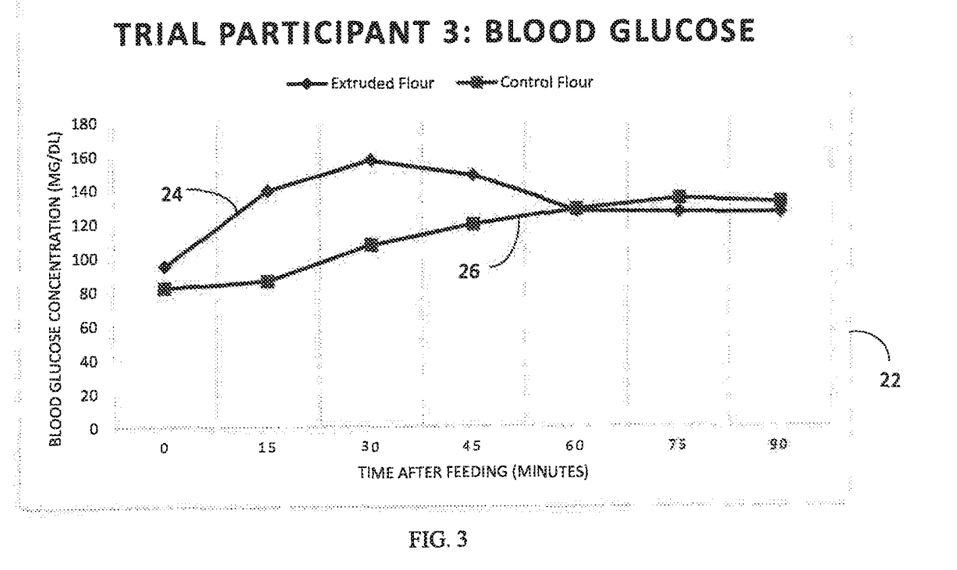
FIG. 3 is a graph showing the blood glucose level (mg/dl) of a third trial participant at times between 0 and 90 minutes after having been fed a sample of an extruded sorghum-based flour according to one embodiment of the present invention, and subsequently a non-extruded sorghum-based control flour.
Figure 4:
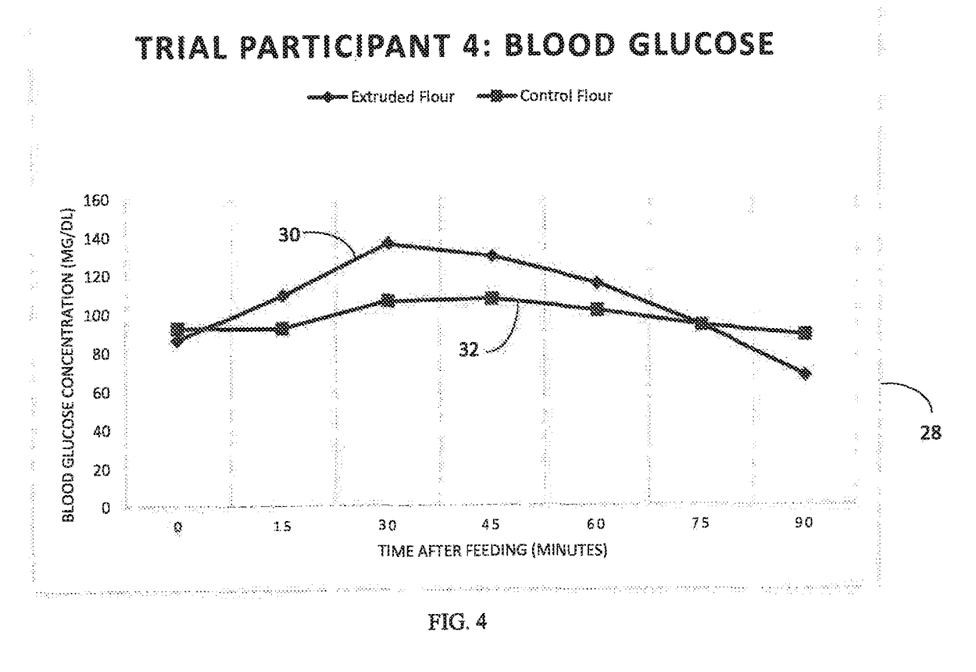
FIG. 4 is a graph showing the blood glucose level (mg/dl) of a fourth trial participant at times between 0 and 90 minutes after having been fed a sample of an extruded sorghum-based flour according to one embodiment of the present invention, and subsequently a non-extruded sorghum-based control flour, and, FIG. 5 is a graph showing the concentration of available L-Proline level (mg/dl) in the blood plasma of a first and second trial participant at times between 0 and 180 minutes after having been fed a sample of an extruded sorghum-based flour according to one embodiment of the present invention, and subsequently a non-extruded sorghum-based control flour.
Figure 5:
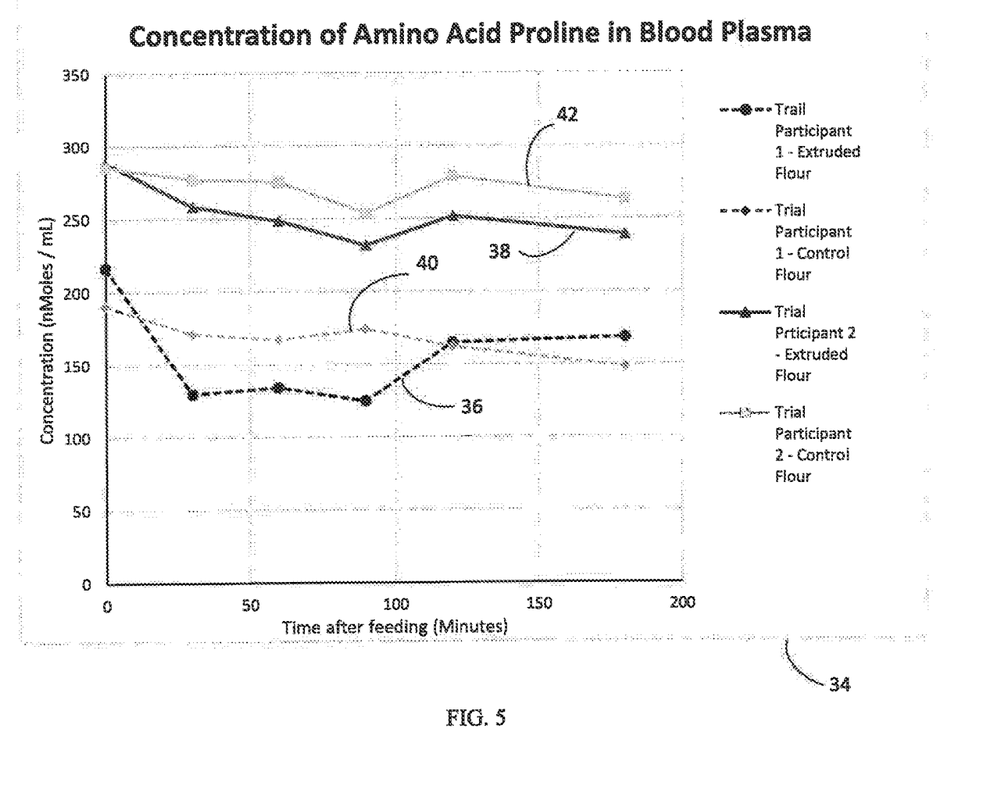

This occurrence is further shown in FIG. 5, in which a representative chart 34 shows that the blood plasma availability of L-Proline after feeding of both the extruded flour and control flour in two trial participants. As shown in chart 34 in FIG. 5, the extruded flour, identified by lines 36 and 38, exhibits a steeper negative slope over the time of 0 to 30 minutes, indicative of decreased availability of L-Proline in the plasma of the respective trial participants, despite relatively higher initial readings at time 0 as compared to the control flour. In contrast, the control flour, identified by line 40, 42, exhibits a relatively gradual negative slope from 0 to 30 minutes, indicative of decreasing availability of L-Proline in the plasma of the respective trial participants, but at a slower rate as compared to the extruded flour. That is to say, that readily available L-Proline in the blood plasma, resulting from feeding of the extruded flour may be more rapidly absorbed by the cells, thereby resulting in a more rapid decline in blood plasma availability of the corresponding amino acids.

Other embodiments and uses of the invention will be apparent to those skilled in the art from consideration from the specification and practice of the invention disclosed herein. All references cited herein for any reason, including all journal citations and U.S./foreign patents and patent applications, are specifically and entirely incorporated herein by reference. It is understood that the invention is not confined to the specific materials, methods, formulations, operating/assay conditions, etc., herein illustrated and described, but embraces such modified forms thereof as come within the scope of the following claims.

What is claimed is:

1. An extruded functionally enhanced flour produced by extruding a grain precursor comprised of starch having a water content of about 10% to about 15% at an extrusion pressure greater than about 2000 psi to yield an as-extruded functionally enhanced flour comprised of an expanded and cold-water soluble structure with a final water content of the as-extruded functionally enhanced flour being about 4% to about 10%, wherein:
    the extruding step is carried out without thermal input beyond heat generated from a changing pressure of extrudate;
    the final water content is attained without a post-extrusion water reducing step; and
    the as-extruded functionally enhanced flour has cold water solubility, is water absorbent, and is oil absorbent.

2. The extruded functionally enhanced flour according to claim 1, wherein the grain precursor comprises a whole grain.

3. The extruded functionally enhanced flour according to claim 1, wherein the grain precursor comprises a single grain or a mixture of two or more grains.

4. The extruded functionally enhanced flour according to claim 1, wherein the grain precursor consists of a whole grain.

5. The extruded functionally enhanced flour according to claim 1, wherein the grain precursor consists of a single grain or a mixture of two or more grains.

6. The extruded functionally enhanced flour according to claim 1, wherein the as-extruded functionally enhanced flour comprises an ingredient of a food product, and is configured to inhibit one of microbial activity and fungal activity in the food product.

7. The extruded functionally enhanced flour according to claim 1, wherein the extrusion pressure is greater than about 3000 psi.

8. The extruded functionally enhanced flour according to claim 1, further comprising an additional cereal grain, legume, fruit, vegetable, whey, proteins, vitamins, minerals, or nutrients.

9. The extruded functionally enhanced flour according to claim 1, wherein the as-extruded functionally enhanced flour is comprised of particles reduced to a prescribed particle size distribution after extrusion.

10. The functionally enhanced flour according to claim 9, wherein the particle size of the as-extruded functionally enhanced flour is reduced by milling the functionally enhanced flour.

11. The functionally enhanced flour according to claim 10, wherein the particle size of the as-extruded functionally enhanced flour is reduced to have an average particle size of between 60 mesh and 100 mesh.

12. The extruded functionally enhanced flour according to claim 1, wherein the extruding step is carried out with a single screw extruder.

13. The extruded functionally enhanced flour according to claim 1, wherein the as-extruded functionally enhanced flour is configured to provide increased cold water solubility in a food product when the as-extruded functionally enhanced flour is used as an ingredient of the food product.

14. The extruded functionally enhanced flour according to claim 1, wherein the as-extruded functionally enhanced flour is configured to provide increased water absorption in a food product when the as-extruded functionally enhanced flour is used as an ingredient of the food product.

15. The extruded functionally enhanced flour according to claim 1, wherein the as-extruded functionally enhanced flour is configured to provide increased oil absorption in a food product when the as-extruded functionally enhanced flour is used as an ingredient of the food product.

16. The extruded functionally enhanced flour according to claim 1, wherein the as-extruded functionally enhanced flour is configured to provide flavor stability in a food product when the as-extruded functionally enhanced flour is used as an ingredient of the food product.

17. The extruded functionally enhanced flour according to claim 1, wherein the as-extruded functionally enhanced flour is configured to increase nutrient and protein availability/digestibility in a food product when the as-extruded functionally enhanced flour is used as an ingredient of the food product.

18. A food product comprising an as-extruded functionally enhanced flour according to claim 1 and at least one non-flour food ingredient.

19. The food product of claim 18, wherein the food product is characterized by enhanced digestibility of nutrients and protein.

20. The food product of claim 18, wherein the as-extruded functionally enhanced flour is configured to increase the digestibility of nutrients and protein in the food product.

21. The food product of claim 18, wherein the food product is characterized by enhanced digestibility of a protein.

22. The food product of claim 18, wherein the as-extruded functionally enhanced flour is configured to increase the digestibility of a protein in the food product.

23. The food product of claim 18, wherein the food product is characterized by an increase in one of digestion and intestinal absorption of L-Glutamic Acid.

24. The food product of claim 18, wherein the food product is characterized by increased blood plasma availability of L-Glutamic Acid.

25. The food product of claim 18, wherein the as-extruded functionally enhanced flour is configured to increase one of digestion and intestinal absorption of L-Glutamic Acid.

26. The food product of claim 18, wherein the as-extruded functionally enhanced flour is configured to increase blood plasma availability of L-Glutamic Acid.

27. The food product of claim 18, wherein the food product is characterized by increased rapidity of absorption of L-Proline.

28. The food product of claim 27, wherein the as-extruded functionally enhanced flour is configured to increase the rapidity of absorption of L-Proline.

29. The food product of claim 18, wherein the food product is characterized by increased water absorption.

30. The food product of claim 18, wherein the as-extruded functionally enhanced flour is configured to increase the water absorption of the food product.

31. The food product of claim 18, wherein the food product is characterized by increased oil absorption.

32. The food product of claim 18, wherein the as-extruded functionally enhanced flour is configured to increase the oil absorption of the food product.

33. The food product of claim 18, wherein the food product is characterized by increased cold water solubility.

34. The food product of claim 18, wherein the as-extruded functionally enhanced flour is configured to increase the cold-water solubility of the food product.

35. The food product of claim 18, wherein the as-extruded functionally enhanced flour is comprised of a cold-water soluble binder.

36. The functionally enhanced flour according to claim 1, wherein the as-extruded functionally enhanced flour comprises a cold-water soluble binder.

37. The food product of claim 36, wherein the cold-water soluble binder is formed from starch during extrusion of the as-extruded functionally enhanced flour.

38. The food product of claim 36, wherein the cold-water soluble binder is formed from starch during extrusion of the as-extruded functionally enhanced flour, and wherein the cold-water soluble binder is water soluble at temperatures below 60 degrees Celsius or 140 degrees Fahrenheit.

39. The food product of claim 36, wherein the cold-water soluble binder is formed from a type of starch during extrusion of the as-extruded functionally enhanced flour and which is water soluble at a temperature below the gelatinization temperature of the type of starch from which the cold-water soluble binder is formed during extrusion of the as-extruded functionally enhanced flour.

40. The food product of claim 39, wherein the cold-water soluble binder is formed from a sorghum starch during extrusion of the as-extruded functionally enhanced flour and which is water soluble at a temperature below the gelatinization temperature of the sorghum starch.

41. The food product of claim 36, wherein the cold-water soluble binder is formed from a sorghum starch during extrusion of the as-extruded functionally enhanced flour and which is water soluble at a temperature below the gelatinization temperature of the sorghum starch.

42. The food product of claim 1, wherein the as-extruded functionally enhanced flour has an average particle size of between 60 mesh and 100 mesh.

43. The food product of claim 42, wherein the average particle size of the extruded functionally enhanced flour is 80 mesh.

44. The functionally enhanced flour according to claim 1, wherein the as-extruded functionally enhanced flour is oil absorbent.

45. The functionally enhanced flour according to claim 1, wherein the final water content of about 4% to about 10% is attained without a post-extrusion water reducing step.

46. The functionally enhanced flour according to claim 1, wherein the grain precursor is comprised of a whole grain that has been de-hulled or de-corticated.

47. The functionally enhanced flour according to claim 1, wherein the grain precursor is comprised of a sorghum.

48. The functionally enhanced flour according to claim 1, wherein no water or moisture is added to the extruder during extruder operation.

49. The functionally enhanced flour according to claim 48, wherein the grain precursor has a water content of no greater than 12%.

50. An extruded functionally enhanced flour produced by extruding a grain precursor comprised of a whole grain cereal grain or a whole grain legume comprised of starch and having a water content of about 10% to about 15% at an extrusion pressure greater than about 2000 psi to yield an as-extruded functionally enhanced flour comprised of an expanded and cold-water soluble structure having a cold water soluble binder formed from starch during extrusion with a final water content of the as-extruded functionally enhanced flour being about 4% to about 10%, wherein:
  the extruding step is carried out without thermal input beyond heat generated from a changing pressure of extrudate;
  the final water content is attained without a post-extrusion water reducing step; and
  the as-extruded functionally enhanced flour contains cold water soluble binder, has cold water solubility, is water absorbent, and is oil absorbent.

51. An extruded functionally enhanced flour produced by extruding a starch-containing admixture consisting essentially of one or more cereal grains and having a water content of about 10% to about 15% at an extrusion pressure greater than about 2000 psi to yield an as-extruded functionally enhanced flour having an expanded and cold-water soluble structure that includes a cold water soluble binder formed of starch during extrusion with a final water content of the as-extruded functionally enhanced flour being about 4% to about 10%, wherein:
  the extruding step is carried out without the thermal input beyond heat generated from a changing pressure of extrudate;
  the final water content is attained without a post-extrusion water reducing step; and
  the as-extruded functionally enhanced flour contains cold water soluble binder, has cold water solubility, is water absorbent, and is oil absorbent.

\* \* \* \* \*